UNITED STATES PATENT OFFICE.

RUFUS N. PRATT, OF HARTFORD, CONNECTICUT, ASSIGNOR TO THE JOHNS-PRATT COMPANY, OF SAME PLACE.

COMPOSITION OF MATTER FOR INSULATING PURPOSES.

SPECIFICATION forming part of Letters Patent No. 551,230, dated December 10, 1895.

Application filed October 31, 1889. Serial No. 328,861. (No specimens.)

*To all whom it may concern:*

Be it known that I, RUFUS N. PRATT, a citizen of the United States, residing at Hartford, in the county of Hartford and State of Connecticut, have invented certain new and useful Improvements in Compositions of Matter for Insulating Purposes, of which the following is a full, clear, and exact specification.

The improvement relates to compositions of matter adapted to be formed and hardened into various shapes for electrical insulation.

The object of the improvement is to provide a composition of matter which will possess high electrical resistance and heat-nonconducting qualities, have great strength and tenacity, and which is more easily and satisfactorily molded and compressed, and at the same time is cheaper than prior insulating compositions.

Heretofore steam-packings have been made of a composition of rubber, sulphur, and asbestos, also from a composition of rubber, sulphur, and mica; but these do not possess the qualities necessary for a good insulator.

Asbestos contains between the fibers a large quantity of iron in granules, and of course all metal must be eliminated or the composition will not afford perfect insulation. If the asbestos is broken up and comminuted or powdered the iron remains in the product, and from this it is impossible to remove the iron. Comminuted or powdered asbestos when bound together by a vulcanizable gum possesses no tenacity, but is brittle, crumbles, and is easily broken up.

Asbestos combed into fibers is fluffy and dry and requires a large quantity of rubber and naphtha to suitably wet it in order that it may be properly bound together, and even with a large amount of liquid gum the fibers cannot be easily and satisfactorily molded and pressed into the numerous forms and shapes into which it is necessary in forming insulating pieces for dynamos and other work. Fibrous asbestos is also an expensive material to obtain.

Mica in a laminated state when bound together by a vulcanizable gum possesses no tensile strength, and this is not easily compressed without the use of considerable gum, which is very undesirable; but after the mineral substance has been removed from between the scales the mica is a non-conductor of heat and electricity of high resistance.

To form an insulating composition possessing all the desirable qualities above mentioned, I dissolve a suitable quantity of rubber, or other vulcanizable gum, and sulphur, or other vulcanizing agent, in naphtha or a similar vehicle, and in this pasty liquid thoroughly mix and incorporate an amount of mica in a finely divided, laminated, or comminuted state. The mica in this state mixes easily with the gum, having smooth and glassy faces and sharp edges it works into the gum. Into this is put an amount of asbestos fibers, preferably about equal to the quantity of mica, the fibers first having been combed to remove all of the metallic dust and granules. This mass is then stirred, so that these fibers twist and wrap themselves about the particles of mica and firmly hold them together. The mica being somewhat slippery easily works its way among the fibers. The composition is then molded into the desired form and hardened by heat and pressure, the particles of mica slipping around in the mold under the pressure and filling out all the corners square and true. As the composition is vulcanized and dried the fibers shrink and tightly hold the mica particles together, while the gum readily adheres to the fibers and binds them together, forming a piece of great hardness and tensile strength.

As the mica and the asbestos are each excellent non-conductors of both heat and electricity the composition forms an insulator of high resistance, and as the mica is cheaper and more easily molded than the fibers the composition can be shaped into various forms and will finish with sharp and even edges, very desirable insulating pieces can be formed for dynamos, which possess great strength and tenacity as well as being cheap. On account of the heat-resisting qualities of this material the composition can be used in armatures and about parts which become heated by magnetization and demagnetization and by the passage of large currents.

I claim as my improvement—

An electrical insulating composition consisting of dense hard rubber, laminated mica, and fibrous asbestos combined as specified.

RUFUS N. PRATT.

Witnesses:
F. A. PRATT,
H. R. WILLIAMS.